July 28, 1970     E. O. WANGERIN     3,521,829

SELF-THREADING TAKE-UP REEL

Original Filed May 20, 1968

ELMER O. WANGERIN
INVENTOR.

BY *H. Herman Childress*
*Robert W. Hampton*
ATTORNEYS

United States Patent Office 3,521,829
Patented July 28, 1970

3,521,829
SELF-THREADING TAKE-UP REEL

Elmer O. Wangerin, Rochester, N.Y., assignor to Eastman Kodak Company, Rochester, N.Y., a corporation of New Jersey
Continuation of application Ser. No. 730,222, May 20, 1968. This application May 15, 1969, Ser. No. 827,102
Int. Cl. B65h 75/28
U.S. Cl. 242—74
17 Claims

ABSTRACT OF THE DISCLOSURE

A self-threading film take-up reel adapted to accommodate film corresponding in width to the spacing between the reel flanges and also film of a predetermined narrower width, comprises a snubber member adjacent one of the reel flanges for automatically engaging the end of a film strip of either width and a flexible guide member adjacent the opposite flange for guiding the end of a narrower film strip so that the latter is engaged by the snubber and wound onto the reel beside the reel flange adjacent the snubber member.

CROSS REFERENCE TO RELATED APPLICATIONS

Reference is made to U.S. Ser. No. 730,222, entitled Self-Threading Take-up Reel, filed May 20, 1968 in the name of Elmer O. Wangerin of which this application is a streamlined continuation.

BACKGROUND OF THE INVENTION

Field of the invention

The present invention relates to self-threading take-up reels usable in film readers, film projectors, tape recorders or related devices, and more particularly to such reels adapted to accommodate strips of film or other web material of different widths.

Description of the prior art

It is well known in the art relating to film or web handling apparatus to provide a flanged take-up reel with a snubber device adapted to engage the end of a film strip or the like as that end of the strip is fed between the flanges of the reel during rotation thereof in a winding direction, thereby causing the strip to be attached automatically to the reel hub so that it can be wound onto the reel. Such previously known take-up reels, however, are not suited to accommodate strip material substantially narrower than the distance between the reel flanges, due to the absence of means for establishing a predetermined axial position at which the end of such a strip is secured to the reel hub and for guiding the strip so that at least one edge of the resulting roll will be laterally positioned by the adjacent reel flange. Accordingly, the use of such self-threading reels in devices adapted to utilize film strips or the like of different widths has heretofore required providing such devices with interchangeable take-up reels of corresponding different sizes.

SUMMARY OF THE INVENTION

The present invention is directed to providing self-threading take-up reels capable of accommodating film strips or the like of different widths, thereby allowing such a reel to be incorporated permanently in a device such as a film reader adapted to display both 16 mm. and 35 mm. film strips. Briefly, this objective is accomplished in accordance with the invention by providing a take-up reel with a flexible snubber member adjacent one of the reel flanges and with a flexible guide member adjacent the other flange or, preferably, with two or more of each such members arranged symmetrically about the reel hub. When a strip of film corresponding in width to the spacing of the reel flanges is fed between the flanges of the rotating reel, it is engaged by the snubber members and wraps both these members and the guide members around the reel hub beneath the wound strip of film. When the end of a film strip of a predetermined narrower width is fed between the reel flanges, however, the flexible guide members initially cause the end of the strip to be engaged by the snubber members immediately adjacent the corresponding reel flange and thereafter laterally guide the resulting roll to maintain it in close lateral proximity to that flange.

Various means for practicing the invention and other advantages and features thereof will be apparent from the following detailed description of an illustrative preferred embodiment thereof, reference being made to the accompanying drawings in which like reference characters refer to like elements.

DESCRIPTION OF THE ILLUSTRATIVE PREFERRED EMBODIMENT

Figure 1:
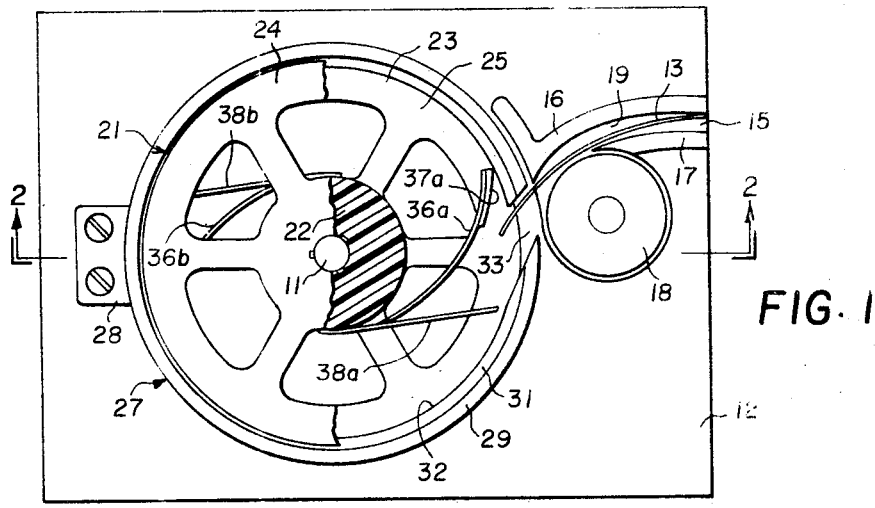
FIG. 1 is a partially broken away plan view of a film take-up reel according to a preferred embodiment of the invention mounted on the corresponding portion of a film reader or similar device.

The film reader device partially depicted in the accompanying drawings to illustrate the preferred embodiment of the invention can be considered to be of the type disclosed in greater detail in commonly assigned pending U.S. patent applications Ser. No. 730,450 entitled "Reel Spindle Drive Means for Film Reader or the Like," filed in the name of Elmer O. Wangerin on May 20, 1968; Ser. Nos. 730,523 and 730,345 entitled "Film Threading Apparatus," filed in the name of Elmer O. Wangerin on May 20, 1968. Briefly, such a reader device comprises a film take-up reel spindle 11 rotatably supported by a stationary support plate 12 and a corresponding film supply reel spindle, not shown, which is similarly supported at the opposite end of the support plate.

As disclosed in the aforementioned pending U.S. Pat. application Ser. No. 730,523, the film supply spindle is adapted to receive film supply reels loaded with strip film of either of two corresponding widths. For example, the illustrative device will be considered to employ either 35 mm. or 16 mm. strips of film, identified respectively in the accompanying drawings by reference numerals 13 and 14. During the film threading operation, the leading end of the strip of film rolled on the supply reel is separated automatically from the roll and is guided into a film gate, not shown, positioned between and somewhat behind the two reel spindles. Beyond the gate, the leading end of the film enters a guide channel 15 defined by guide wall members 16 and 17 and by roller member 18, and is thereby guided along a fixed path toward the take-up reel spindle 11. By reference to FIG. 2, it will be seen that the lower edge of the portion of the film strip in channel 15 is adjacent the bottom surface 19 of that channel 15 regardless of the width of the film.

Figure 2:
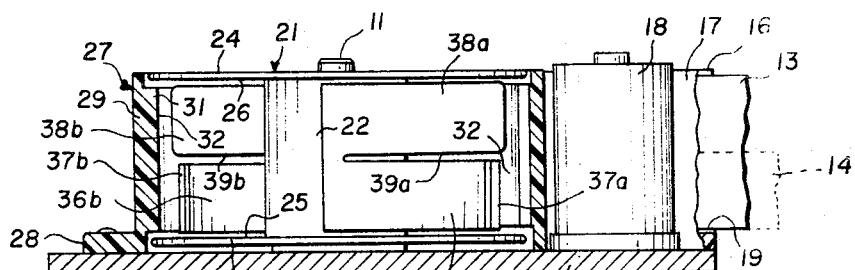
FIG. 2 is a front elevational view of the structure shown in FIG. 1, partially cross sectioned along the line 2—2 of FIG. 1.

A film take-up reel 21, to which the invention is specifically directed, is attached to and rotatable with the film take-up spindle 11. At opposite ends of its generally cylindrical hub member 22, the take-up reel 21 is provided with circular lower and upper flanges 23 and 24; the respective flat internal surfaces 25 and 26 of which are spaced apart by a distance only slightly greater than the width of the 35 mm. film 13. As shown in FIG. 2, the reel 21 is positioned in axial relation to the spindle 11 such that the internal surface 25 of the lower reel flange 23 is even with or just slightly below the plane defined by the bottom surface 19 of guide channel 15. A guide rim member 27 is immovably attached to the support plate 12 by mounting lug 28 and includes a generally cylindrical rim 29 located circumferentially about the take-up reel 11. This rim 29 includes an internal lip 31, which projects inwardly between the edges of the reel flanges 23 and 24 to define an internal cylindrical film guide surface 32 surrounding the reel hub member 22 except in the region of opening 33 extending through the rim 29 in alignment with the corresponding end of guide channel 15.

As the film is being fed through the film gate and guide channel 15 from the film supply reel, the film take-up reel 21 is simultaneously driven in a winding direction, i.e. clockwise as viewed in FIG. 1, so that the peripheral speed of the reel hub member 22 exceeds the longitudinal speed of the film moving toward the take-up reel 21. The drive means by which this is accomplished is represented in FIG. 2 as comprising a motor 34 connected to spindle 11 through a gear and friction clutch unit 35; further details of such drive means being disclosed in the above described U.S. patent application Ser. No. 730,450. Accordingly, as the end of the film emerges from the end of channel 15, it enters opening 33 in the rim 29 and is introduced between the flanges 23 and 24 of the rotating take-up reel 21 with the lower edge of the film adjacent the lower reel flange 23.

To secure the end of the film strip automatically to the hub member 22 of the reel 21, a pair of snubber members 36a and 36b formed of a thin flexible material, such as Phosphor bronze or a synthetic plastic, is attached to and extend outwardly from opposite sides of the hub member 22 in generally tangential relation thereto adjacent the lower reel flange 23. At their outer ends, the respective snubber members 36a and 36b are provided with friction pads 37a and 37b made of sponge rubber or some other suitable relatively soft material having a high coefficient of friction in contact with the film material. When the rotating film take-up reel 21 is empty, these pads 37a and 37b are moved along the cylindrical internal surface 32 of the rim 29 and are maintained in resilient contact therewith by the resiliency of the rearwardly bowed snubber members 36a and 36b, and also by centrifugal force.

Adjacent the other flange 24 of the take-up reel 21, a pair of film guide members 38a and 38b are cemented or attached in some other manner to the reel hub member 22 and extend tangentially therefrom in alignment with the corresponding snubber members 36a and 36b. These film guide members 38a and 38b are likewise formed of this resilient sheet material, preferably by combining each guide member and the corresponding snubber member as a one-piece bifurcated element. It should be noted, however, that the guide members 38a and 38b terminate short of the cylindrical internal surface 32 of rim 29 and therefore assume their normally straight conditions when the reel 21 is empty. As will be described in greater detail below, a pair of lateral edges or surfaces 39a and 39b (see FIG. 2) of the respective guide members 38a and 38b is disposed generally parallel to and spaced from the opposite internal surface 25 of lower reel flange 23 by a distance only slightly in excess of the width of the 16 mm. film.

Figure 3:
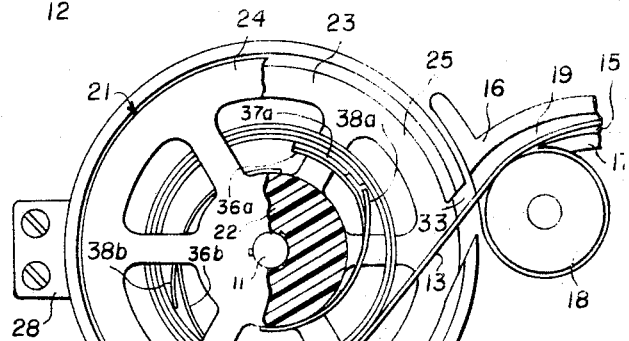
FIG. 3 is a plan view corresponding to a portion of FIG. 1 showing the film snubber and guide members engaged with a strip of film corresponding in width to the axial distance between the reel flanges.

Upon entering between the flanges 23 and 24 of the rotating take-up reel 21 through opening 33 in the guide rim 29, the end of a 35 mm. film strip 13 is engaged by the friction pads 37a and 37b of the snubber members 36a and 36b and thereby directed in a clockwise direction along the internal cylindrical guide surface 32. Due to the high coefficient of friction between the friction pads 37a and 37b and the film strip, the strip tends to adhere to one or both pads and is thereby drawn toward the reel hub member 22 as the corresponding tension developed in the snubber members 36a and 36b produces an inwardly directed force component on the friction pads 37a and 37b. By reference to FIG. 3, which shows a 35 mm. film strip 13 in the process of becoming attached to the reel hub member 22, it will be seen that the film guide members 38a and 38b are engaged by the inner surface of the end of the strip and thereby are also wrapped toward the reel hub member 22 beneath the film strip 13. It will be apparent, however, that the 35 mm. film strip 13 is guided laterally between the opposed inner surfaces of the reel flanges 23 and 24, thereby obviating the need for the guide members 38a and 38b to perform the corresponding function.

As successive film convolutions are developed about the reel hub member 22, they further constrain the innermost convolution engaged by the friction pads 37a and 37b; thereby causing the end of the film strip 13 to be wrapped progressively tighter until the guide end snubber members become wound tightly around the hub member 22 beneath the innermost convolution of the film strip 13. When this condition occurs, the friction pads 37a and 37b are compressed tightly against the film strip 13, thereby securing the developing film roll in frictional engagement with the reel hub member 22. Accordingly, it will be apparent that the film take-up reel 21 can no longer be rotated in a winding direction at a speed which will cause the film strip 13 to be absorbed faster than it is provided by the supply reel. Therefore, the gear and clutch unit 35 is provided with a friction clutch, not shown, which is adapted to slip at a predetermined torque so that the tension in the film strip 13 between the reels allows the take-up reel 21 to rotate only as fast as is dictated by the corresponding drive means controlling the unwinding rotation of the supply reel.

Figure 4:
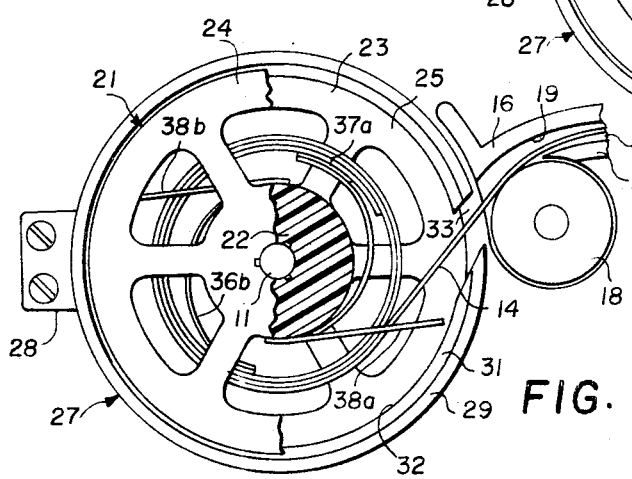
FIG. 4 corresponds to FIG. 3 and shows a strip of film of a predetermined narrower width guided and engaged by the respective guide and snubber members.

When the end of a 16 mm. strip 14 of film is fed as shown in FIG. 4 through rim opening 33, its lower edge is located initially near the internal surface 25 of the lower reel flange 23. However, as the film strip 14 is engaged by the friction pads 37a and 37b of the snubber members 36a and 36b and thereby progressively convoluted toward the reel hub member 22, the upper reel flange 24 is ineffective to maintain the convoluting end portion of the strip 14 adjacent flange 23. Therefore, in the absence of other guide means for laterally maintaining the film adjacent the lower reel flange 23, the inherent curl of the film strip 14 and the influence of the snubber 36a and 36b would almost certainly result in overlapping misalignment of successive film convolutions on the take-up roll. As a consequence, it is very likely that the edges of the film strip 14 would be abraded and buckled by being jammed diagonally against the reel flanges 23 and 24. Even worse, however, is the possibility of the outer convolution slipping entirely off the roll and becoming jammed into the space adjacent the more remote flange 24; in which case the film strip 14 would inevitably be seriously damaged as a result of the accompanying twisting and kinking to which it would be subjected.

To avoid such occurrences, the lateral edges 39a and 39b of the respective flexible guide members 38a and 38b are adapted to engage laterally the corresponding upper edge of a 16 mm. film strip 14 as that strip initially enters between the reel flanges 23 and 24; and, thereafter, to maintain the strip 14 in adjacent relation to the lower reel flange 23. Since the 16 mm. film strip 14 is slightly narrower than the axial space defined between the guide members 38a and 38b and the internal surface 25 of the lower reel flange 23, the guide members 38a and 38b remain substantially in their respective tangential positions shown in FIG. 4 throughout the film winding operation, thereby insuring that all of the film convolutions wound onto the take-up roll remain adjacent the lower reel flange 23.

Although the roll of film on the take-up reel is securely attached to reel hub member 22 during the film winding operation, it should be apparent that the end of the film separates readily from that hub when the film subsequently has been unwound from the take-up reel back onto the supply reel. Thereupon, the flexible snubber and guide members return automatically to their former positions so that the take-up reel is again in condition to accept a film strip of either width during the succeeding film threading operation.

In place of the friction pads employed in the illustrative preferred embodiment of the invention to engage the film with the snubber members, one or more teeth could be provided at the outer end of a similar snubber member to perform the same function in a device limited to accommodating only the type of film strips which include marginal perforations engageable by such teeth. Furthermore, by employing such teeth or other alternative means for engaging the film strips more positively with such a snubber member, it is possible in many cases to eliminate the necessity for laterally enclosing the take-up reel. Also, it should be recognized that the invention can be adapted readily to provide a self-threading film take-up reel capable of accommodating film of more than two widths, simply by providing the required number of flexible film guide members in appropriate axial relation to the reel flanges and to the flexible snubber members.

The invention has been described in considerable detail with reference to a preferred embodiment thereof, but it will be undertood that variations and modifications can be effected within the spirit and scope of the invention.

What is claimed is:

1. A take-up member for receiving at least first and second strips having respectively first and second widths, the first width being larger than the second width, said take-up member comprising:
    (a) a hub for receiving thereabout either the first or second strip,
    (b) first and second guide surfaces disposed at either end of said hub,
    (c) a flexible guide member attached to said hub and having an edge, said edge disposed to guide and to facilitate the forming of a coil of the second strip between said edge and said second surface,
    (d) a flexible snubber member attached to said hub, said flexible snubber member extending from said hub adjacent said second guide surface between said edge and said second guide surface, and
    (e) strip engaging means disposed on said snubber member, 2. A take-up member according to claim 1 in which said guide member and snubber members comprise elongate strips of thin flexible material capable of being wound about said hub.

3. A take-up member according to claim 2 in which said guide member is integral with said snubber member in the form of a bifurcated element attached to said hub at an end of said element joining said guide and snubber members.

4. A take-up member according to claim 1 including plurality of said guide members and a corresponding number of said snubber members, said guide and snubber members being equiangularly spaced about said hub.

5. A take-up member according to claim 1 in which said strip engaging means for engaging comprises a material with a surface having a relatively high coefficient of friction with respect to the strips to be wound onto said take-up member.

6. A self-threading take-up reel for receiving at least first and second strips having respectively first and second widths, the first width being greater than the second width, said reel comprising:
    (a) a hub member having opposite ends,
    (b) first and second flange members attached respectively to said opposite ends of said hub member,
    (c) a flexible snubber member extending from said hub member, said flexible snubber member including means for engaging and securing one of the strips with respect to said hub member as said snubber member is thereby wound about said hub member beneath the one strip,
    (d) a flexible guide member extending from said hub member adjacent said second flange member, said flexible guide member being disposed,
        (1) to be wound about said hub member beneath the first strip when the first strip is secured about said hub member by said snubber member, and
        (2) to guide laterally an adjacent edge of the second strip and to thereby maintain the second strip adjacent said first flange member as the second strip is wound onto said reel.

7. A self-threading take-up reel according to claim 6 including a plurality of said snubber members and a corresponding number of said flexible guide members, said snubber and guide members being symmetrically arranged about said hub member.

8. A self-threading take-up reel according to claim 6, wherein there is included guide means disposed to direct the first and second strips into engagement with said flexible snubber member.

9. A self-threading reel including first and second flanges, and a hub disposed therebetween for receiving either a first strip having a first width substantially corresponding to the spacing between said first and second flanges or a second strip having a second width less than the first width,
    the invention characterized by a snubber member disposed for engaging either of the first or second strips, and
    a flexible guide member disposed adjacent said first flange for guiding the second strip to be engaged by said snubber member and for facilitating the winding of the second strip into a coil between said flexible guide member and said second flange.

10. A member for receiving strip material or the like comprising:
    (a) a hub member rotatable about its axis for winding strip material thereon, and
    (b) a flexible guide member mounted with respect to the axis of rotation of said hub member so that said guide member will direct a leading end portion of the strip material to be wound on said hub member into the desired axial position along said hub member.

11. A member according to claim 10 wherein said guide member projects from said hub member in substantially tangential fashion, and one end of said hub member is spaced from the adjacent part of the guide member by a distance only slightly greater than the width of the strip material.

12. A member according to claim 11 further comprising snubbing means carried by said reel for engaging the strip material guided toward said one end of said hub member by said guide member.

13. A self-threading member for receiving at least first and second strips having respectively first and second widths, the first width being larger than the second width, said member comprising:
    (a) first and second guide surfaces,
    (b) a hub disposed between said first and second guide surfaces for receiving thereabout either the first or second strip,
    (c) a flexible guide member attached to said hub and having an edge, said edge disposed to guide and to facilitate the forming of a coil of the second strip between said edge and said first guide surface, and (d) a flexible snubber member attached to said hub and having means for engaging one of the strips, said snubber member disposed so that said means for engaging is brought into engagement with the one strip when the one strip is inserted between said first and second guide surfaces.

14. A member as claimed in claim 13, wherein said edge is disposed substantially parallel to said first guide surface and is spaced from said first guide surface a distance in excess of the second width.

15. A member as claimed in claim 14, wherein said flexible guide member extends tangentially from said hub and is disposed adjacent said second guide surface.

16. A self-threading take-up member for receiving at least first and second strips having respectively first and second widths, the first width being greater than the second width, said member comprising:

(a) a rotatable take-up hub having opposite ends,
(b) first and second guide surfaces located at said opposite ends of said take-up hub,
(c) a snubber member extending from said take-up hub adjacent said first guide surface for engaging an end of either the first or second strip, and
(d) a flexible guide member extending from said take-up hub adjacent said second guide surface for directing the second strip onto said take-up hub adjacent said first guide surface.

17. A self-threading take-up member for receiving at least first and second strips having respectively first and second widths, the first width being greater than the second width, said take-up member comprising:

(a) a rotatable take-up hub,
(b) a snubber member extending from said take-up hub for engaging an end of either the first or second strips and for facilitating the winding of the engaged strip about the said take-up hub, and
(c) a flexible guide member extending from said take-up hub for directing the second strip onto said take-up hub into a desired axial position along said take-up hub.

References Cited

UNITED STATES PATENTS

| | | | |
|---|---|---|---|
| 1,104,296 | 7/1914 | Gammeter | 242—74 X |
| 2,119,943 | 6/1938 | Marks | 242—74.2 |
| 2,734,692 | 2/1956 | Robinson | 242—74.2 |
| 3,084,883 | 4/1963 | Buck | 242—71.1 |

FOREIGN PATENTS

| | | |
|---|---|---|
| 850,108 | 9/1952 | Germany. |

NATHAN L. MINTZ, Primary Examiner